United States Patent [19]

Schmidt

[11] 3,950,305

[45] Apr. 13, 1976

[54] STABILIZED POLYVINYL BUTYRAL AND STABILIZER FOR POLYVINYL BUTYRAL

[75] Inventor: Erwin Schmidt, Kelkheim, Taunus, Germany

[73] Assignee: Hoechst Aktiengesellschaft, Frankfurt am Main, Germany

[22] Filed: July 10, 1974

[21] Appl. No.: 487,365

Related U.S. Application Data

[63] Continuation of Ser. No. 332,809, Feb. 16, 1973, abandoned.

[30] Foreign Application Priority Data

Feb. 22, 1972 Germany............................ 2208167

[52] U.S. Cl. 260/45.7 P; 260/45.95 R; 260/45.95 C; 260/45.95 S; 260/73 L; 428/437
[51] Int. Cl.$^2$........................................... C08K 5/49
[58] Field of Search.. 260/45.7 P, 45.95 R, 45.95 C, 260/45.95 S, 73 L; 161/199; 428/437

[56] References Cited

UNITED STATES PATENTS

| | | | |
|---|---|---|---|
| 3,346,526 | 10/1967 | Buckley et al. | 260/45.95 R |
| 3,535,277 | 10/1970 | Miller et al. | 260/45.7 P |
| 3,567,682 | 3/1971 | Zaweski | 260/45.7 P |
| 3,746,654 | 7/1973 | Cottman | 260/45.7 P |

Primary Examiner—Eugene C. Rzucidlo
Attorney, Agent, or Firm—Curtis, Morris & Safford

[57] ABSTRACT

Stabilized polyvinyl butyral is obtained by incorporating a usual phenolic stabilizer together with a phosphorous acid triester, the composition containing from about 0.6 to 4.5 % by weight of the sum of the phenolic stabilizer and the phosphorous acid triester based on the resin. The stabilized polyvinyl butyral resin which may be plasticized is used for laminated glass or baking varnishes.

4 Claims, No Drawings

STABILIZED POLYVINYL BUTYRAL AND STABILIZER FOR POLYVINYL BUTYRAL

This is a continuation of application Ser. No. 332,809 filed Feb. 16, 1973, now abandoned.

The present invention relates to stabilized, optionally plasticizer containing polyvinyl butyral for laminated glass and baking varnishes, as well as to a stabilizer for polyvinyl butyral.

Under the conditions of laminated glass or baking varnish processing, which is carried out at temperatures above 100°C, the polyvinyl butyral used is degraded to a certain extent and turns yellow, the result of which is a deterioration of the mechanical and optical properties.

It is known to retard the thermal degradation by adding phenolic stabilizers, but this increases the yellowing effect.

It has now been found that polyvinyl butyral can be stabilized in an especially advantageous manner by adding to the polymer or the mixture thereof with plasticizers from about 0.6 to 4.5 weight %, preferably from 1.5 to 3 weight %, relative to the polyvinyl butyral, of a mixture of from 5 to 50 weight % of at least one usual phenolic stabilizer and from 50 to 95 weight % of at least one phosphorous acid triester which, as is the phenolic stabilizer, is soluble in the stabilized mixture at the temperatures of use and non-volatile at processing temperatures.

As phenolic stabilizers, there are for example used: 2,6-di-tert.-butyl-p-cresol, 2,4,6-trimethylphenol, 2,6-di-tert.-butyl-4-lauryl-phenol, bornyl-xylenol, furthermore the compounds of the following formulae:

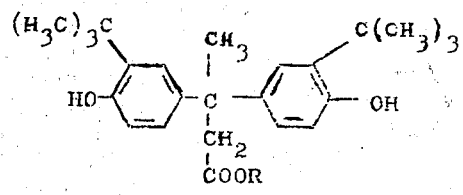

R = H, alkyl, allyl

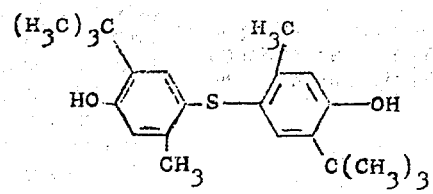

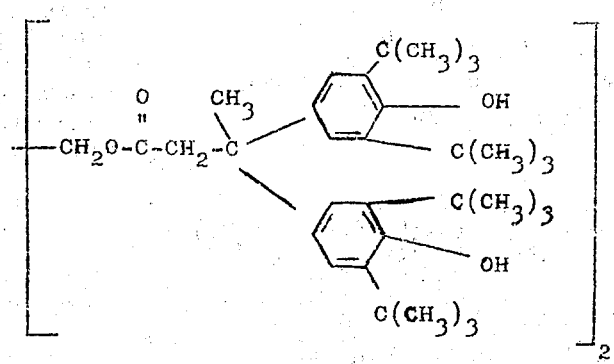

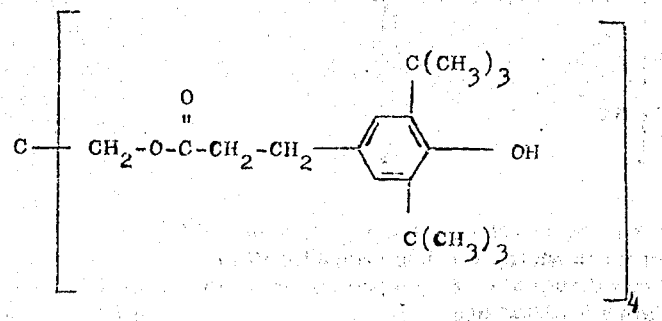

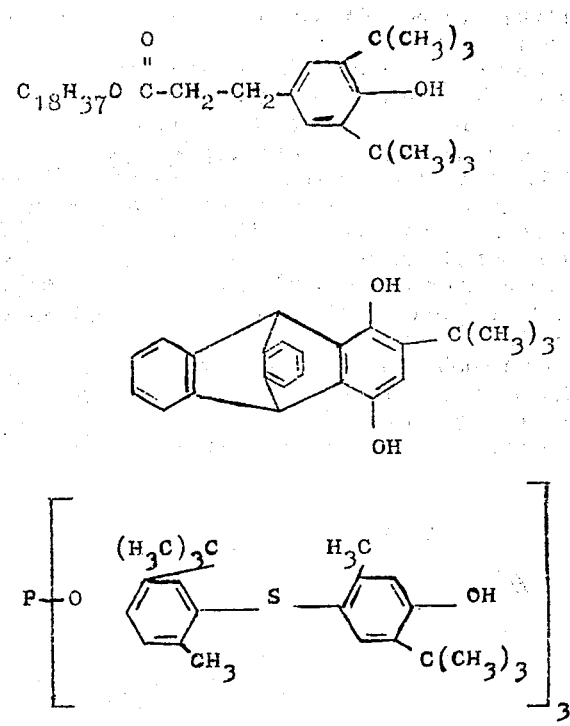

Suitable phosphorous acid triesters are for example: trilauryl-phosphite, tristearyl phosphite, diphenyloctyl phosphite, furthermore the compounds of the following formulae:

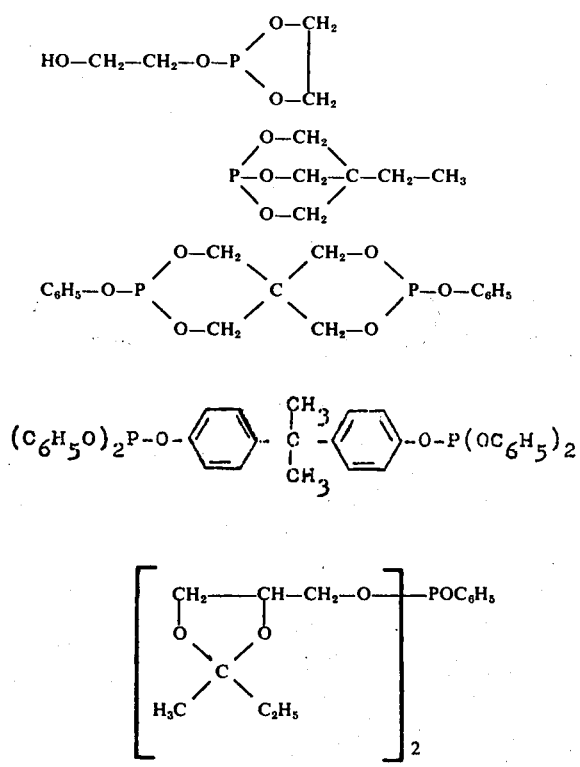

The stabilizers may be added to the polyvinyl butyral separately or in admixture, as such or in dissolved form, during or immediately after its preparation, or also before or during its processing.

When the stabilizer compositions according to the present invention are used, the thermal degradation of polyvinyl butyral is inhibited without causing a substantial yellowing. On the other hand, phosphorous acid triester alone has no perceptible influence on the degradation of the polyvinyl butyral and increases the yellowing. Moreover, the stabilizer compositions of the present invention do not have an optimum stabilizing effect when they are used in any ratio; this optimum effect being attained only in the indicated mixture range.

The stabilizer amounts required depend to a great extent on the processing conditions, the conditions of polyvinyl butyral preparation, the additives used, especially the plasticizers, and also on the special application; thus, for example, in the case of extrusion of polyvinyl butyral sheets for laminated glass, the stabilizer amounts necessary depend substantially on the extrusion temperature and the residence time in the heating zone. In Examples 1, 3, 5 and 7, at a temperature of 140°C and a residence time of more than 90 minutes, a degradation and yellowing is prevented. In Example 4, the activity of the stabilizer begins to decrease after 30 minutes already. An addition of too small amounts of stabilizer results in an insufficient activity, while too large amounts of stabilizer added cause cross-linking.

The following examples illustrate the invention.

In order to prove the stabilizing effect, polyvinyl butyral is kneaded, with addition of plasticizer and stabilizers, at 140°C and 60 rpm in a Brabender Plastograph with kneader, type W 50 EC. The degradation of the material is characterized by the torque of the kneader; this torque being an index number for the kneading resistance.

For determining the discoloration of the material, small glass tubes having an inside diameter of 9 mm are charged with samples of the kneader contents. The yellowing of these samples is measured by means of a Hellige oil comparator. A high color number means heavy yellowing.

For the Examples, 21.1 g of polyvinyl butyral (molecular weight about 250 000) are mixed with 10.9 g of triethyleneglycol-bis-2-ethyl butyrate as plasticizer, in which the stabilizers are previously dissolved, and the mixture is given into the kneader preheated to 140°C. The percentages indicated in the Examples are by weight and based on the polyvinyl butyral.

EXAMPLE 1

0,3 % 2,6-di-tert.-butyl-p-cresol
1,8 % trilauryl phosphite

| Kneading time (min) | color number | torque (mkp) |
|---|---|---|
| 5 | 1–2 | 2.34 |
| 10 | 1–2 | 2.04 |
| 30 | 1–2 | 1.95 |
| 60 | 1–2 | 1.95 |
| 90 | 2 | 2.04 |

EXAMPLE 2

0.15 % 2,6-di-tert.-butyl-p-cresol
0.9 % trilauryl phosphite

| Kneading time (min) | color number | torque (mkp) |
|---|---|---|
| 5 | 2 | 2.0 |
| 10 | 2 | 1.87 |
| 30 | 3–4 | 1.63 |
| 60 | 5 | 0.97 |
| 90 | 6 | 1.08 |

When 0.15 % of 2,6-di-tert.-butyl-p-cresol and 0.45 % of trilauryl phosphite are used, a visible yellowing occurs after 10 minutes already, and degradation is even more rapid. On the other hand, degradation and yellowing in this case are substantially inferior to the degradation and the yellowing occurring when 0.15 % of di-tert.-butyl-p-cresol alone is added.

EXAMPLE 3

1.1 % bornyl-xylenol
1.9 % trilauryl phosphite

| Kneading time (min) | color number | torque (mkp) |
|---|---|---|
| 5 | 2 | 1.90 |
| 10 | 2 | 1.81 |
| 30 | 2 | 1.80 |
| 60 | 2 | 1.69 |
| 90 | 2 | 1.73 |

EXAMPLE 4

0.15 % bornyl-xylenol
1.8 % trilauryl phosphite

| Kneading time (min) | color number | torque (mkp) |
|---|---|---|
| 5 | 2 | 1.92 |
| 10 | 2 | 1.77 |
| 30 | 3–4 | 1.24 |
| 60 | 4 | 0.83 |
| 90 | 5 | 0.65 |

EXAMPLE 5

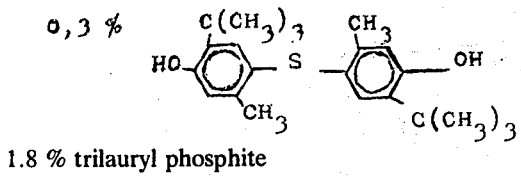

0,3 %

1.8 % trilauryl phosphite

| Kneading time (min) | color number | torque (mkp) |
|---|---|---|
| 5 | 2 | 2.21 |
| 10 | 2 | 1.9 |
| 30 | 2 | 1.9 |
| 60 | 2 | 1.9 |

EXAMPLE 6

1.8 % bornyl-xylenol
0.9 % trilauryl phosphite

| Kneading time (min) | color number | torque (mkp) |
|---|---|---|
| 5 | 3 | 1.96 |
| 10 | 5 | 1.84 |
| 30 | 6 | 1.65 |
| 60 | 6 | 1.48 |
| 120 | 6 | 1.41 |

EXAMPLE 7

1.8 % of a phenyl groups containing phosphite (Irgastab (R) CH 300)
0.3 % 2,6-di-tert.-butyl-p-cresol

| Kneading time (min) | color number | torque (mkp) |
|---|---|---|
| 5 | 1–2 | 2.12 |
| 10 | 1–2 | 1.95 |
| 30 | 2 | 1.87 |
| 60 | 2 | 1.78 |
| 90 | 2–3 | 1.73 |

EXAMPLE 8

Manufacture of a laminated glass pane: 800 g of polyvinyl butyral are mixed with 300 g of triethyleneglycol-bis-(2-ethyl butyrate), which contain 2 g of 2,6-di-tert.-butyl-p-cresol and 12 g of trilauryl phosphite.

This mixture is rolled with friction for 15 minutes on a roller having a temperature of from 75°–85°C. After sufficient homogenization, a rolled sheet having a thickness of from 0.38 to 0.40 mm and a width of 350 mm is taken off, which is then placed between two glass plates, one having a thickness of 2 mm and the other of 3 mm. This preliminary compound is pressed for 10 minutes, after a 30 minutes preheating, at 140°C and 10 kg/cm².

After cooling, the laminated glass is clear and colorless. In the falling ball test according to DIN 52 306, the compound so obtained shows impact marks which have the same aspect as those of comparative tests or are even better.

COMPARATIVE EXAMPLE 1

1.8 % bornyl-xylenol without phosphite

| Kneading time (min) | color number | torque (mkp) |
|---|---|---|
| 5 | 4 | 1.97 |
| 10 | 6 | 1.76 |
| 30 | 11 | 1.40 |
| 60 | 11 | 1.12 |
| 90 | 11 | 1.00 |

COMPARATIVE EXAMPLE 2

1,8 % trilauryl phosphite without phenolic component

| Kneading time (min) | color number | torque (mkp) |
|---|---|---|
| 5 | 1–2 | 1.94 |
| 30 | 2 | 0.94 |
| 60 | 5 | 0.67 |
| 90 | 6 | 0.55 |
| 120 | 8 | 0.50 |

COMPARATIVE EXAMPLE 3 without stabilizer

| Kneading time (min) | color number | torque (mkp) |
|---|---|---|
| 5 | 2 | 1.76 |
| 30 | 2 | 0.81 |
| 60 | 2 | 0.51 |
| 90 | 3 | 0.39 |
| 120 | 4 | 0.32 |

COMPARATIVE EXAMPLE 4

1,5 % 2,6-di-tert.butyl-p-cresol
6 % trilauryl phosphite

| Kneading time (min) | color number | torque (mkp) |
|---|---|---|
| 5 | 2 | 1.90 |
| 10 | 2 | 1.75 |
| 30 | 2 | 1.15 |
| 60 | 2 | 2.21 |
| 90 | 6 | 2.12 |
| 120 | 6 | 2.05 |

As compared to the other Examples, the kneaded mass is insoluble in i-propanol after 120 minutes, which means that a cross-linking of the polymer has occurred.

What is claimed is:

1. A solid stabilized composition consisting essentially of a polyvinyl butyral resin which may be optionally plasticized, said composition comprising from about 0.6 to 4.5 weight %, preferably from 1.5 to 3 weight %, relative to the polyvinyl butyral, of a mixture of from 5 to 50 weight % of at least one phenolic compound selected from the group consisting of: 2,6-di-tert.-butyl-p-cresol, 2,4,6-trimethylphenol, 2,6-di-tert.-butyl-4-lauryl-phenol, bornyl-xylenol,

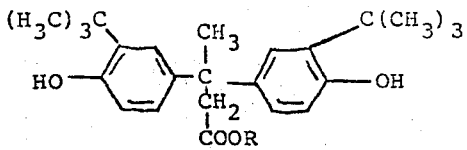

where R is hydrogen, alkyl or allyl

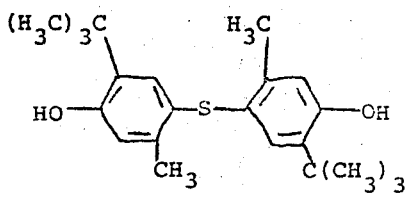

,

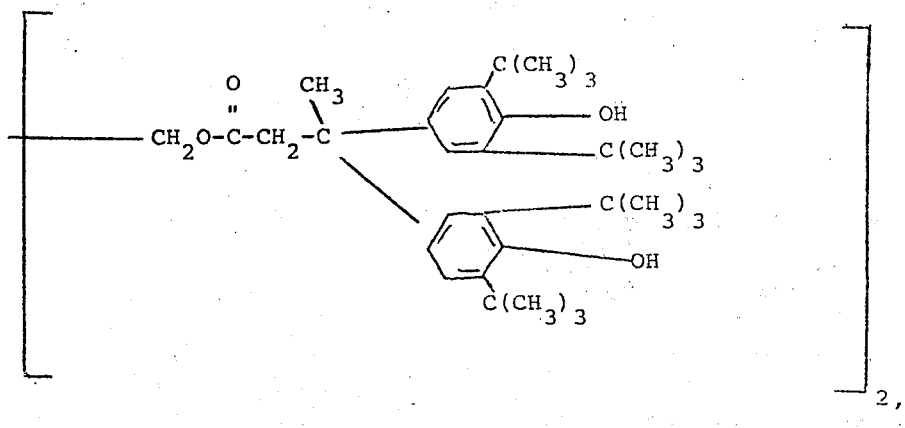

2,

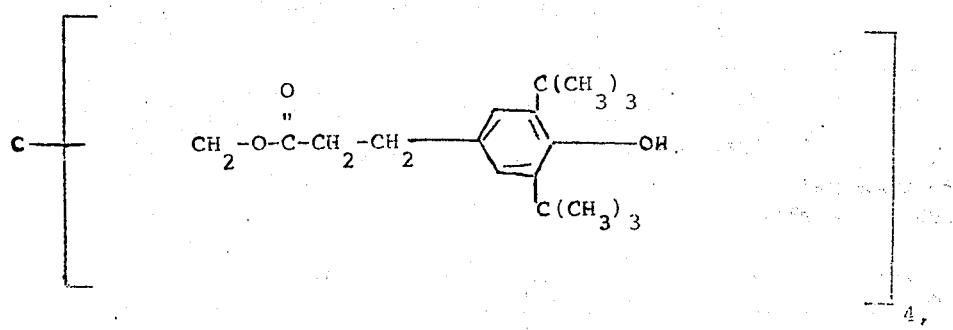

4,

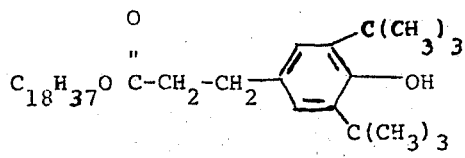

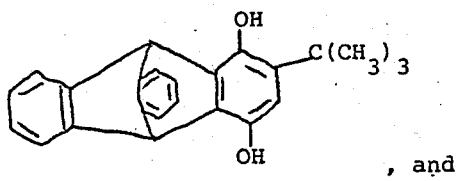, and

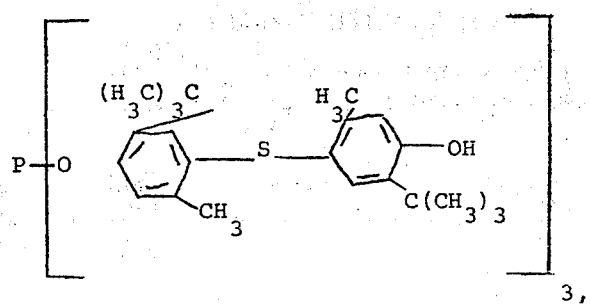

and from 50 to 95 weight % of at least one phosphorous acid triester which, as is the phenolic stabilizer, is soluble in the stabilized mixture and non-volatile at processing temperatures.

2. A stabilizer for polyvinyl butyral, containing from 5 to 50 weight % of at least one phenolic compound selected from the group consisting of: 2,6-di-tert.-butyl-p-cresol, 2,4,6-trimethylphenol, 2,6-di-tert.-butyl-4-lauryl-phenol, bornyl-xylenol,

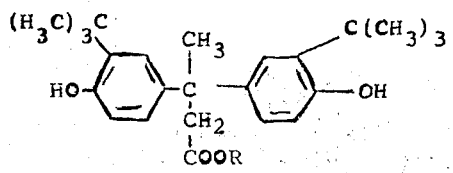

where R is hydrogen, alkyl or allyl

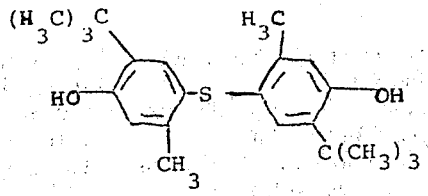

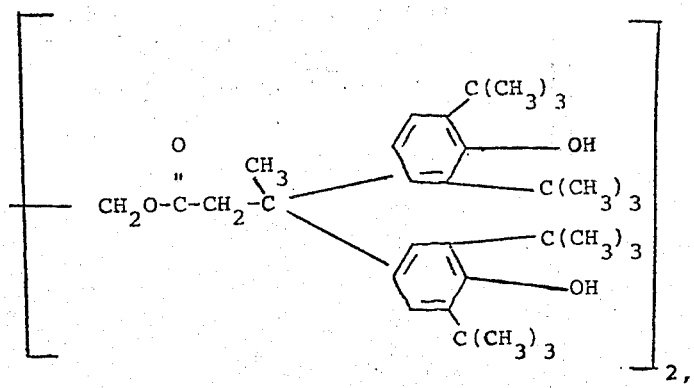

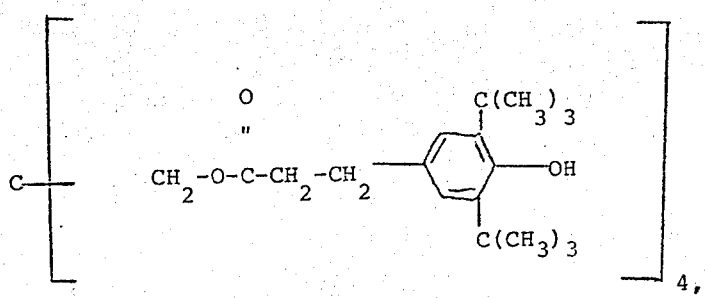

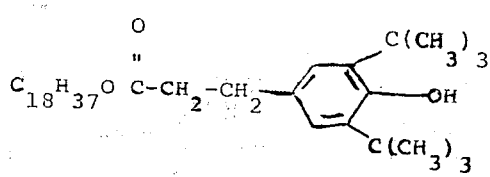

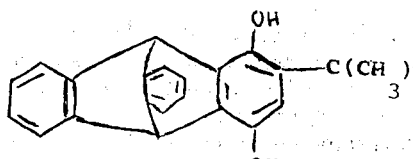

, and

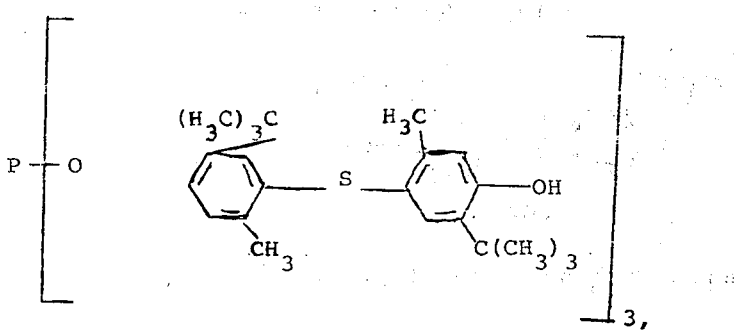

and from 50 to 95 weight % of at least one soluble non-volatile phosphorous acid triester.

3. In a process for the stabilization of optionally plasticizer containing solid polyvinyl butyral, the improvement which comprises: adding to said polyvinyl butyral from about 0.6 to 4.5 weight %, preferably from 1.5 to 3 weight %, relative to the polyvinyl butyral, of a mixture of from 5 to 50 weight % of at least one phenolic compound selected from the group consisting of: 2,6-di-tert.-butyl-p-cresol, 2,4,6-trimethylphenol, 2,6-di-tert.-butyl-4-lauryl-phenol, bornyl-xylenol,

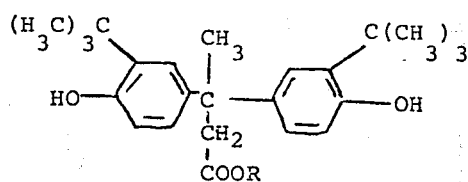

where R is hydrogen, alkyl or allyl,

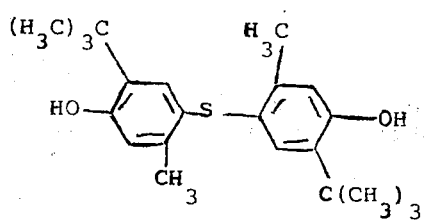

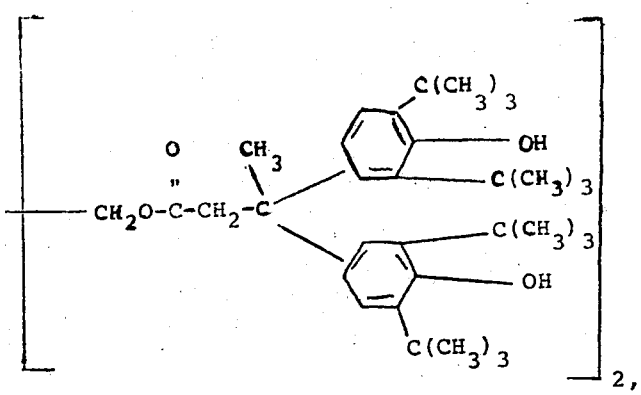
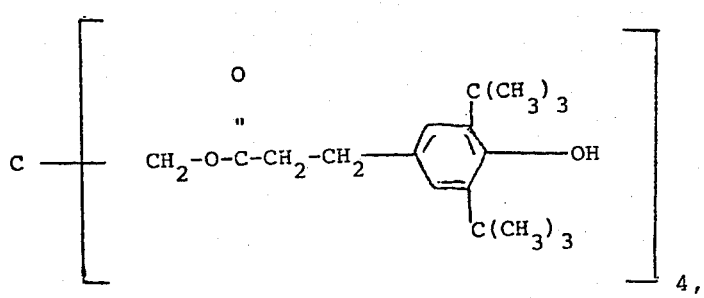
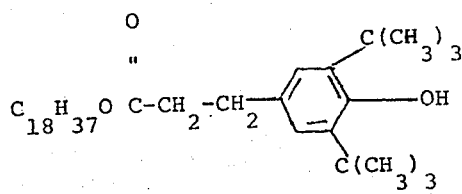
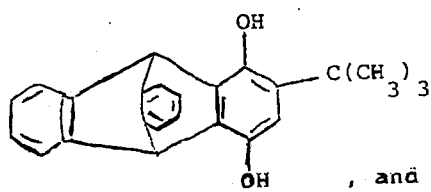
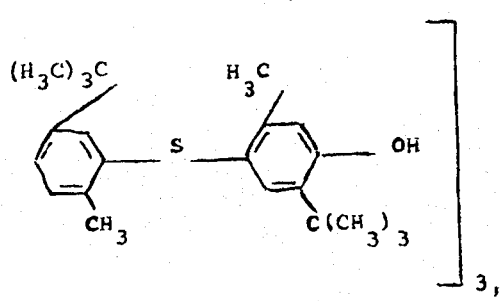
and from 50 to 95 weight % of at least one phosphorous acid triester which, as is the phenolic stabilizer, is soluble in the stabilized mixture and non-volatile at processing temperatures.
4. A process as recited in claim 3, wherein the said stabilized polyvinyl butyral is used in a process for the preparation of laminated glass.
* * * * *